United States Patent [19]

Stewart

[11] Patent Number: 5,119,947
[45] Date of Patent: Jun. 9, 1992

[54] GLASSWARE SLIDE HOLDER DEVICE

[76] Inventor: Andrew Stewart, P.O. Box 1653, Garden Grove, Calif. 92640

[21] Appl. No.: 664,620

[22] Filed: Mar. 4, 1991

Related U.S. Application Data

[63] Continuation-in-part of Ser. No. 418,231, Oct. 6, 1989, abandoned.

[51] Int. Cl.⁵ .............................................. A47G 29/00
[52] U.S. Cl. ...................................... 211/71; 211/94; 211/162
[58] Field of Search .................... 24/94, 162, 74, 71; 248/311.2, 312.1; 312/132, 128, 330, 322

[56] References Cited

U.S. PATENT DOCUMENTS 4,019,638  4/1977  Miller .
4,936,469  6/1990  Drower ........................ 211/94 X Primary Examiner—Blair M. Johnson

[57] ABSTRACT

Disclosed is a storage device for glassware which is particularly adapted for use in a transport vehicle having a cabinet which holds glassware. The device includes a base adjacent an entryway of the cabinet, and a glassware mounting member having glassware holding means. The glassware mounting member is slideably attached to the base to enable the mounting member to be manually pulled, at least partially, from the base to extend beyond the entryway to allow glassware to be placed on or removed from the glassware holding means.

1 Claim, 2 Drawing Sheets

GLASSWARE SLIDE HOLDER DEVICE

RELATED APPLICATION

This application is a continuation-in-part application of U.S. patent application Ser. No. 07/418,231, now abandoned, filed Oct. 6, 1989, and entitled "Glass Slide Holder Device," which is incorporated herein by reference and made a part of this application.

BACKGROUND OF THE INVENTION

1. Field of the Invention

This invention relates to a device for safely storing glassware in storage cabinets of transport vehicles, such as campers, trailers, aircraft, and boats to prevent damage during movement.

2. Background Discussion

Those traveling in their recreational vehicles daily encounter the difficulty of preventing their glassware (glasses, cups, mugs, or any drinking container) from cracking or breaking. Typically, recreational vehicles have storage cabinets for glassware, but these cabinets are limited in size and their height is usually only six to eight inches. Moreover, these cabinets do not have devices which prevent the glassware from moving. Consequently, stored glassware moves within the cabinets when the vehicle stops or starts, banging against adjacent glassware and breaking.

SUMMARY OF THE INVENTION

It is the objective of this invention to provide in a camper, trailer, boat, aircraft or similar transport vehicle a storage device for glassware.

The device of this invention has several features, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENT," one will understand how the features of this invention provide its advantages, which include its anti-breakage capability and simplicity and convenience of use.

The first feature of this invention is that the device has a base and a glassware mounting member having glassware holding means. The glassware mounting member is slideably attached to the base to enable the mounting member to be manually pulled, at least partially, from the base to extend beyond the entryway of the cabinet to allow glassware to be placed on or removed from the glassware holding means.

The second feature is that the glassware holding means comprise a pair of adjacent elements that coact to clamp a sidewall of the glassware between them. One of the elements of the glassware holding means has a beveled surface.

DESCRIPTION OF THE DRAWING

The preferred embodiment of this invention, illustrating all its features, will now be discussed in detail. This embodiment depicts the novel and non-obvious device of this invention shown in the accompanying drawing, which is for illustrative purposes only. This drawing includes the following figures (FIGS.), with like numerals indicating like parts:

BRIEF DESCRIPTION OF THE DRAWING

Figure 1:
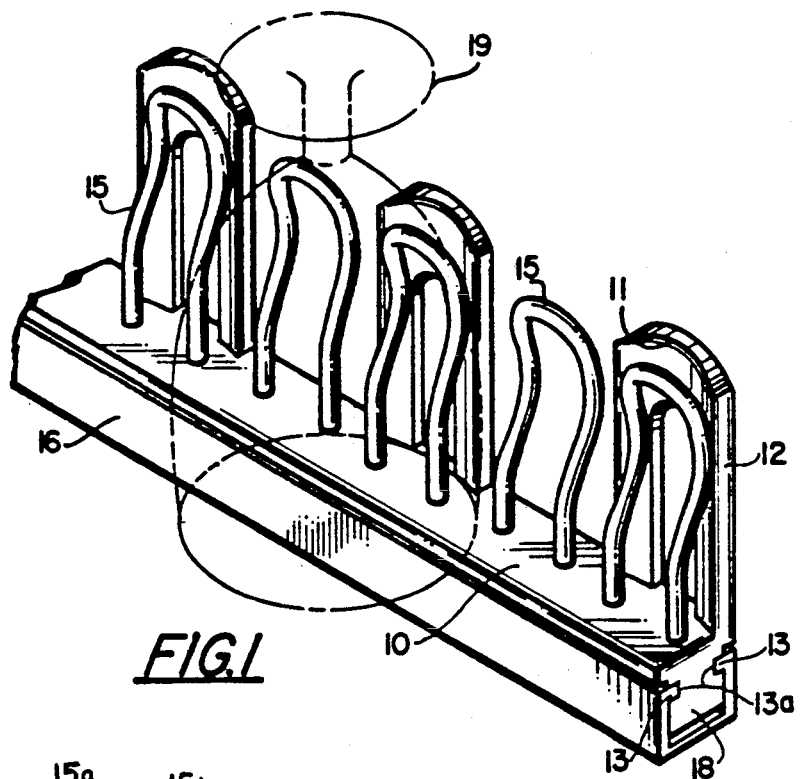

FIG. 1 is a perspective view of the device of this invention for holding glassware in the cabinet of a transport vehicle.

Figure 2:
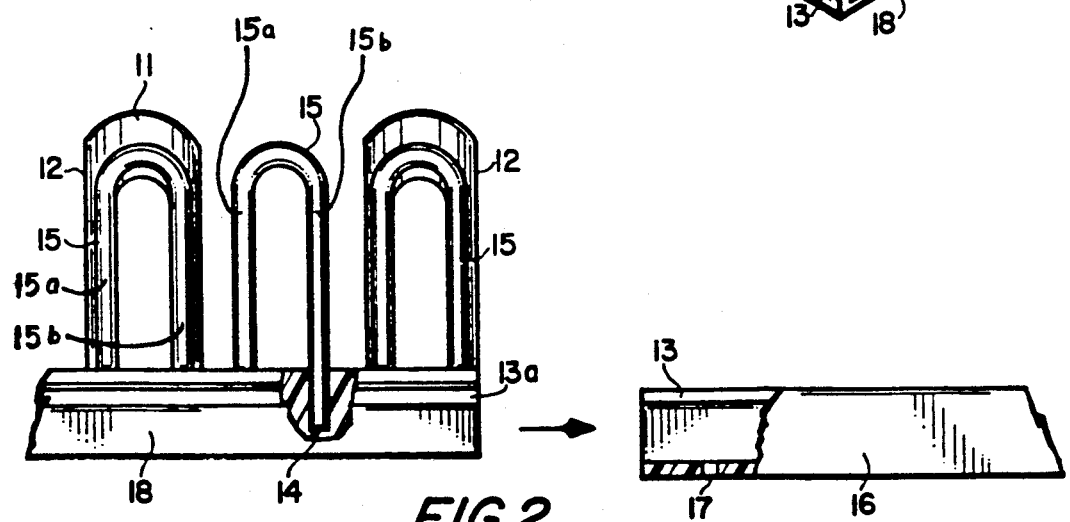

FIG. 2 is a fragmentary side elevational view of the device of this invention, showing a fragmentary portion of its base.

Figure 3:
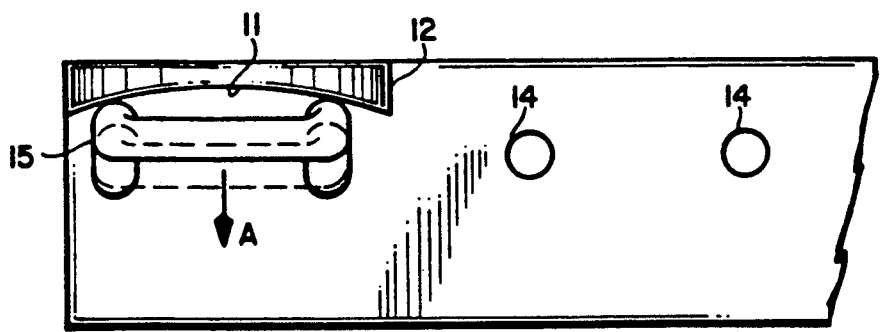

FIG. 3 is an enlarged, fragmentary of the top of the device of this invention.

Figure 4:
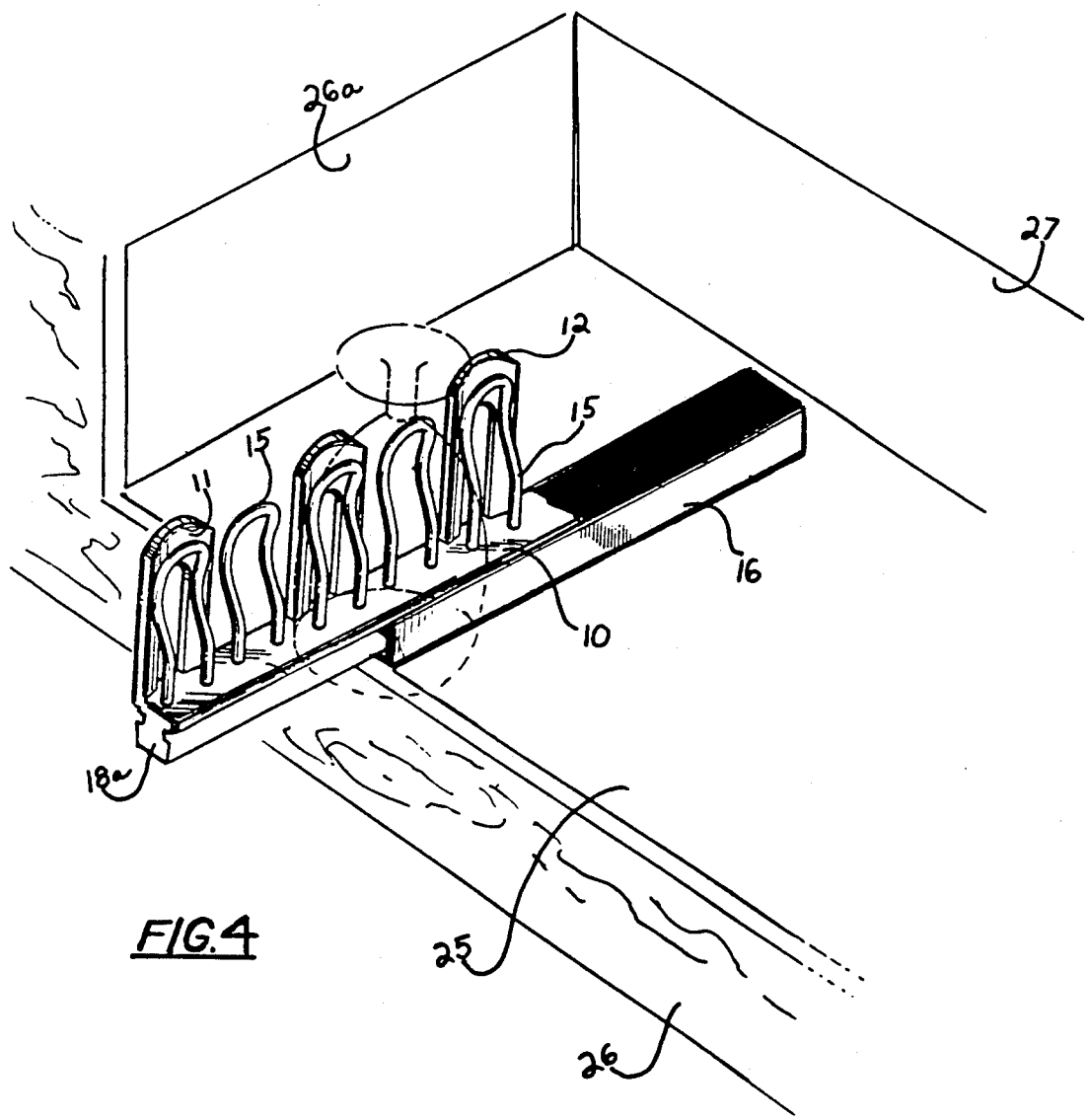

FIG. 4 a perspective view of the device of this invention mounted in a cabinet of a transport vehicle.

DETAILED DESCRIPTION OF THE PREFERRED EMBODIMENT

As illustrated in FIGS. 1 through 4, the device 10 of this invention includes a base 16 having a generally U-shaped cross-section and a glassware mounting member 18. The base 16 is securely attached to the floor 25 of a cabinet 26 in a transport vehicle by screws (not shown) which pass through holes 17 in the bottom of the base 16. The base 16 is elongated having a length from about 6 to about 24 inches and extends from the entryway 26a of the cabinet to the rear wall 27 (FIG. 2) of the cabinet 26. Both the base 16 and the mounting member 18 are made from any suitable plastic material, for example nylon, by injection moulding techniques. The glassware mounting member 18 has a pair of grooves 13 on opposite sides of its foundation 18a and the base 16 has complimentary fingers 13a which fit into the grooves. This allows the mounting member 18 to slide outwardly relative to the base 16 as shown in FIG. 4.

The glassware mounting member 18 includes the enlarged generally rectangular configured foundation 18a which supports beveled arches 12 and U-shaped pegs 15 that extend upwardly from this foundation. The arches 12 are formed during moulding of the mounting member 18 and are integral therewith and positioned in a row along one longitudinal edge. Each arch 12 has an internal beveled surface 11 which faces an adjacent peg 15. Each peg 15 has a pair of legs 15a and 15b which fit snugly in corresponding holes 14 (FIG. 2 and 3) in the top surface of the foundation 18a. The combination of arch 12 and peg 15 provides a clamp which grasps the side wall of a glass 19 inserted between an arch and peg. The beveled design of the arches compensates for any curvature of the glass 19 to provide a snug fit of the side wall of the glass between the arch and peg. The pegs 15 are flexible and can pivot as indicted by the arrow A. Thus, a peg moves away from an arch as a glass is inserted between an arch and peg. The peg 15 acts like a spring to apply a slight pressure on the side wall of the glass 19 to hold the glass in position while the transport vehicle is moving.

It is important that the base 16 be positioned near the entryway 26a into the cabinet 26 generally at a right angle and generally horizontal. This allows the mounting member 18 to be manually pulled through the entryway 26a when a glass 19 is to be removed from the device 10 or placed on the device. Conveniently, the mounting member 18 may be partially or completely removed from the base 16. One could thus remove the mounting member 18 and carry it to a nearby sink or dishwasher. The height of the cabinet 26 usually is very low, only about 6–10 inches. Thus the device 10 of this invention is especially designed to allow the glass to be placed on or removed from the device 10 after the glassware mounting member 18 has been withdrawn from the interior of the cabinet 26. Typically, the glass 19 is almost as tall as the height of the cabinet 26 and could not be securely mounted within the cabinet if mounting means were fixedly mounted within the cabinet. Thus, in accordance with this invention the glassware mounting member 18 is designed to extend beyond the entryway 26a during removal or storage of glassware.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:
1. In a transport vehicle,
   a cabinet which holds glassware having a curved surface and has a height of from about 6 to about 10 inches and an entryway through which the glassware is placed into and removed from the cabinet, a floor, and a rear wall,
   a storage device for glassware including
      an elongated base attached to the floor of the cabinet adjacent the entryway of the cabinet and extending lengthwise form the entryway towards the rear wall, terminating near the rear wall, and a glassware mounting member having glassware holding means,
   said glassware mounting member being slideably attached to the base to enable the mounting member to be manually pulled, at least partially, from the base to extend beyond the entryway and allow glassware to be placed on or removed from the glassware holding means,
   said glassware holding means comprising a pair of adjacent elements that coact to clamp a sidewall of the glassware between them, one of said elements having a beveled surface which engages the curved surface of the glassware.

* * * * *